C. DESHLER.
CARDS FOR GAMES.
APPLICATION FILED NOV. 27, 1907

907,133.

Patented Dec. 22, 1908.

*Fig. 1.*

Spell —
1. a-bis'
   (a-b-y-s-s)
2. bī' ō
   (b-a-y-o-u)
3. kwīr
   (c-h-o-i-r)
4. dō
   (d-o-u-g-h)
5. ū-kir
   (e-u-c-h-r-e)
   9.

4  Pronounce —
1. G-a-l-a
   (gā'-lä)
2. H-a-r-a-s-s
   (har'as)
3. H-e-i-n-o-u-s
   (hā'nus)
4. Q-u-a-y
   (kē)
5. I-t-a-l-i-c
   (i-tāl'-ik)

*Fig. 2.*

*Fig. 4.*

RIGHT

WRONG

1. Name easternmost Cape of South America.
   (St. Roque)
2. Name the Capitol of Illinois.
   (Springfield)
3. Name most populous city of Western Continent.
   (New York).
4. Name largest river in South America.
   (Amazon).
5. What isthmus connects North and South America.
   (Panama.)
   7

*Fig. 3.*

WITNESSES:
S. A. Rogers.
E. A. Pell.

INVENTOR
Charles Deshler
BY
Wm H Canfield
ATTORNEY

UNITED STATES PATENT OFFICE.

CHARLES DESHLER, OF NEW BRUNSWICK, NEW JERSEY.

CARDS FOR GAMES.

No. 907,133.

Specification of Letters Patent.

Patented Dec. 22, 1908.

Application filed November 27, 1907. Serial No. 404,067.

*To all whom it may concern:*

Be it known that I, CHARLES DESHLER, a citizen of the United States, residing at New Brunswick, in the county of Middlesex and State of New Jersey, have invented certain new and useful Improvements in Cards for Games; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved game and is of a style known as "Quiz," and is adapted for different topics or studies, as it can be divided into such branches as "Arithmetic Quiz," "Natural History Quiz," "Literature Quiz," "Grammar Quiz," "History Quiz," "Geography Quiz," "Spelling Quiz," "Pronunciation Quiz," "Miscellaneous Quiz," and any number of sub-classes thereof. These branches themselves can be subdivided into "Junior," "Intermediate" and "Senior," and thus a wide field of use is presented.

The game has educational advantages that make it valuable in training, and presenting facts in a manner to cause a player to have the correct answer to a question fixed in his mind.

Figure 1 illustrates a card used in a "Junior Spelling Quiz." Fig 2 shows a card used in "Junior Pronunciation Quiz," and Fig. 3 is one used in "Junior Geography Quiz." Fig. 4 is a view of a marker card.

The game is played with a pack of question and answer cards, preferably to the number of forty, and five marker cards are also supplied so that the score can be kept. Each "Question and Answer" card has say five questions and the correct answers thereto on its face, and the questions and answers are arranged alternately, each question being followed by its answer, for convenience. Each question and answer card has also a number thereon, the cards in the series being numbered consecutively up to the number of cards in the pack. Each marker card has printed, on one end, the word "Right" or its equivalent, and on the other end "Wrong" or a similar word.

The number of players should not exceed six, or one more than the number of marker cards. The question and answer cards are shuffled and the players can draw for the deal, according to the numbers on the cards drawn, the lucky one being the dealer or teacher. The dealer or teacher shuffles and deals the question and answer cards, five at a time to each pupil or player and one card face down to himself. The five cards in each player's possession are used for tallying. The rest of the pack are laid stacked and face down in front of the dealer or teacher. The dealer now arranges the five marker cards and the one question and answer card, from which he is about to quiz, in his hand. He then proceeds to ask the first player, on his left, the first question from his card and exacts an answer before he proceeds to the next player. As the question is answered the teacher places a marker card, face down, before pointing toward the player, with its "Right" or "Wrong" end nearest the player, according to his answer, the answer on the question and answer card in the teacher's hand being the standard.

After all players have answered the question, the marker cards are turned over sidewise so as to not reverse the indication of "Right" or "Wrong", and each player answering incorrectly must deposit one of his "Question and Answer" cards on the center of the table or play-board as a tally. The dealer collects the marker cards and proceeds as in the case of the first question, with the next one, and so on until the one "Question and Answer" card in his possession is used up. It will be seen from this that the pupil with the greatest number of "Question and Answer" cards in his possession is used up. It will be seen from this rectly, and is the dealer or teacher for the next hand. If two or more players correctly answer the same number of questions, each draws a card from the face-down cards on the table, and the low number drawn entitles the holder to be the dealer or teacher.

In case the dealer's or teacher's "Question and Answer" card has recently been used for a quiz, he may substitute another for it. The number of cards and the multiplicity of questions on each card make a wide field of inquiry, for instance, forty cards with five questions in each, give two hundred questions and it is not necessary to repeat a card with its questions during a game.

The drawings give an idea of the scope of the game, and its educational value, in addition to its being a source of amusement, will be apparent.

Having thus described my invention, what I claim is:—

1. A set of playing cards comprising a plurality of cards having on one face a series of questions, each question being followed by a correct answer thereto, and each card having a number thereon, the numbers running consecutively.

2. A set of playing cards comprising a plurality of cards having on one face a series of questions, each question being followed by a correct answer thereto, in combination with a set of marker cards having on the opposite ends a legend indicating a correct or incorrect answer, respectively.

3. A set of playing cards comprising a plurality of cards having on one face a series of questions, each question being followed by a correct answer thereto, in combination with a set of marker cards having on the opposite ends a legend indicating a correct or incorrect answer, respectively, the number of marker cards being equal to the number of questions on each playing card.

In testimony, that I claim the foregoing, I have hereunto set my hand this 16th day of November 1907.

CHARLES DESHLER.

Witnesses:
WM. H. CAMFIELD,
E. A. PELL.